(12) United States Patent
Ryu et al.

(10) Patent No.: US 8,398,948 B2
(45) Date of Patent: Mar. 19, 2013

(54) METHOD OF PREPARING CARBON NANOTUBE FROM LIQUID PHASED-CARBON SOURCE

(75) Inventors: Beyong-Hwan Ryu, Daejeon (KR); Ki-Jeong Kong, Daejeon (KR); Hyun-Ju Chang, Daejeon (KR); Young-Min Choi, Daejeon (KR); Jae-do Lee, Daejeon (KR); Ha-Kyun Jung, Daejeon (KR); Chang-Gyoun Kim, Daejeon (KR); Han-Sung Park, Cheongju-si (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 1332 days.

(21) Appl. No.: 10/551,484

(22) PCT Filed: Mar. 31, 2004

(86) PCT No.: PCT/KR2004/000745
§ 371 (c)(1),
(2), (4) Date: Jan. 4, 2007

(87) PCT Pub. No.: WO2004/087565
PCT Pub. Date: Oct. 14, 2004

(65) Prior Publication Data
US 2007/0160522 A1    Jul. 12, 2007

(30) Foreign Application Priority Data
Apr. 2, 2003 (KR) .................. 10-2003-0020858

(51) Int. Cl.
*C01B 31/0246* (2006.01)
*B82Y 40/00* (2011.01)
(52) U.S. Cl. .................................. 423/447.1; 977/842
(58) Field of Classification Search ............... 423/447.1; 977/842
See application file for complete search history.

(56) References Cited

U.S. PATENT DOCUMENTS 5,424,054 A   6/1995  Bethune et al.
6,210,800 B1  4/2001  Nesper et al.
6,221,330 B1  4/2001  Moy et al.
7,001,581 B2 * 2/2006  Kawakami et al. ........ 423/447.3

FOREIGN PATENT DOCUMENTS

| WO | WO 99/06618 | 2/1999 |
| WO | WO 02/076887 A | 10/2002 |
| WO | WO 03/022739 A | 3/2003 |

OTHER PUBLICATIONS

T. Guo, P. Nikolaev, A. Thess, D.T. Colbert, R.E. Smalley; "Catalytic growth of single-walled nanotubes by laser vaporization", *Chemical Physics Letters 243*, (1995), pp. 49-54.

Toshiya Okazaki, Hisanori Shinohara; "Synthesis and characterization of single-wall carbon nanotubes by hot-filament assisted chemical vapor deposition", *Chemical Physics Letters 376*, (2003), pp. 606-611.

Ch. Tashner, F. Pacal, A. Leonhardt, P. Spatenka, K. Bartsch, A. Graff, R. Kaltofen; "Synthesis of aligned carbon nanotubes by DC plasma-enhanced hot filament CVD", *Surface and Coating Technology 174-175*, (2003), pp. 81-87.

* cited by examiner

*Primary Examiner* — Stuart Hendrickson
(74) *Attorney, Agent, or Firm* — Frommer Lawrence & Haug LLP; Ronald R. Santucci

(57) ABSTRACT

This invention relates to a method to induce growth of carbon nanotubes using a liquid phased-hydrocarbon based material under a critical range of equilibrating between liquid and gas phases, thereby easily manipulating a required carbon source. This invention also relates to a method to facilitate easy generation of a carbon backbone of the carbon nanotube because the reaction is performed in the presence of a metal nanoparticle or a metal compound capable of spontaneously generating a seed catalyst which stimulates the growth of carbon nanotubes as well as secures safety enough for the industrial application by using a mild reaction condition within the critical range. Accordingly, this invention can produce the carbon nanotube with high transition efficiency under a mild condition with a relatively lower temperature and pressure than those in conventional gas phased-methods without using a costly equipment, thereby cost-effectively producing the carbon nanotube in large quantities.

7 Claims, 1 Drawing Sheet

METHOD OF PREPARING CARBON NANOTUBE FROM LIQUID PHASED-CARBON SOURCE

This application is a 371 of PCT/KR2004/000745 filed on Mar. 31, 2004, published on Oct. 14, 2004 under publication number WO 2004/087565 A1 which claims priority benefits from South Korean Patent Application Number 10-2003-0020858 filed Apr. 2, 2003.

FIELD OF THE INVENTION

The present invention relates to a method for the preparing carbon nanotube from a liquid phased-carbon source. More particularly, the present invention relates to the method which uses a liquid phased-hydrocarbon based material as carbon source and comprises the steps of maintaining an equilibrium condition between liquid and gas phases by heating and pressurizing the carbon source to the lo range of critical temperature and critical pressure of the carbon source, and reacting and cooling the carbon source in the presence of a metal seed catalyst to induce the growth of carbon nanotube.

The method for the preparation of carbon nanotube according to the present invention has the advantages that it is relatively easy to handle a raw material due to the use of a liquid phased-carbon source different from the known methods for the preparation of carbon nanotube from a gas phased-carbon source, and it can be scaled up for commercial or industrial production in a cost-effective manner since it is possible to prepare the carbon nanotube under a mild condition maintaining a relatively low temperature and pressure that correspond to the critical range of the carbon source used.

BACKGROUND OF THE INVENTION

Carbon nanotube has a cylindrical tube structure which is formed by binding neighboring three carbon atoms to one carbon atom, making a hexagonal ring shape, and being rolled up a sheet repeated with the hexagonal ring shape in a beehive form. The carbon nanotube has excellent properties that it is thermally, chemically and mechanically very stable and its electric features vary greatly depending on the structure. Its application fields are very broad including nano electric devices, electric field emission emitter, hydrogen and ion storage, composite, catalytic supporter, sensor and so on.

The currently known methods for preparing the carbon nanotube are as follows. In the early stage of developing methods for producing nanotube, a small amount of the carbon nanotube for studying its structure and electric features was prepared by using arc discharge and laser deposition methods. Since then, several methods including arc discharge, laser evaporation, CVD (chemical vapor deposition), plasma synthesis methods have been developed for the mass production of carbon nanotube (*Chemical Physics Letters*, Vol. 376, (5-6) 606-611, 2003; *Surface and Coatings Technology*, Vol. 174-175, (9-10) 81-87, 2003; U.S. Pat. No. 5,424,054; U.S. Pat. No. 6,210,800; U.S. Pat. No. 6,221,330; International Patent Publication No. WO99/006618 A1). The conventional methods have prepared the carbon nanotube in small quantities under a severe reaction condition such as at a high temperature ranging from hundreds and thousands degrees or in a controlled vacuum condition, and required the use of expensive equipments. Therefore, there still exist many problems in the conventional methods for commercially producing the carbon nanotube.

Meanwhile, when a pure liquid phased-material is heated and pressurized to a critical temperature (Tc) and a critical pressure (Pc), its phase has an intermediate and unique feature between liquid and gas phase.

This single-phase is defined as a supercritical fluid, and the fluid's state may be characterized by the critical temperature and critical pressure.

The supercritical fluid has both a gas-like delivery feature and a liquid-like soluble feature, and is capable of approaching to a particular range of physicochemical features such as density, diffusion rate and dielectric constant by appropriately regulating its temperature and pressure without undergoing a change in phase boundary from liquid to gas. Since the supercritical fluid has been regarded as a solvent which can successively regulate its property due to the above mentioned features and shows unique, intermediate characteristics of liquid and gas, it has been identified as a material of interest for a variety of scientific fields.

The present inventors have therefore endeavored to solve the problems of conventional methods for preparing the carbon nanotube from a liquid phased-carbon source such as pyrogenic synthesis, high cost, low productivity and small scale production. As a result, the present inventors have developed a method for preparing carbon nanotube from a liquid phased-carbon source which uses a liquid phased-hydrocarbon based material as carbon source, which exists in a liquid phase at room temperature or under a state of heating and pressurization, and comprises the steps of reacting and cooling the carbon source in the presence of a metal seed catalyst to induce the growth of carbon nanotube crystal under the condition of maintaining a supercritical fluid state by regulating a reaction condition into the range of a critical temperature and a critical pressure of the carbon source used.

SUMMARY OF THE INVENTION

Accordingly, an object of the present invention is to provide a method for the preparation of carbon nanotube from a liquid phased-carbon source which makes possible mass-production of carbon nanotube with a relatively low expense.

BRIEF DESCRIPTION OF THE DRAWINGS

The above and other objects and features of the present invention will become apparent from the following description of the invention, when taken in conjunction with the accompanying drawings which respectively show; wherein.

DETAILED DESCRIPTION OF THE INVENTION

Figure 1:
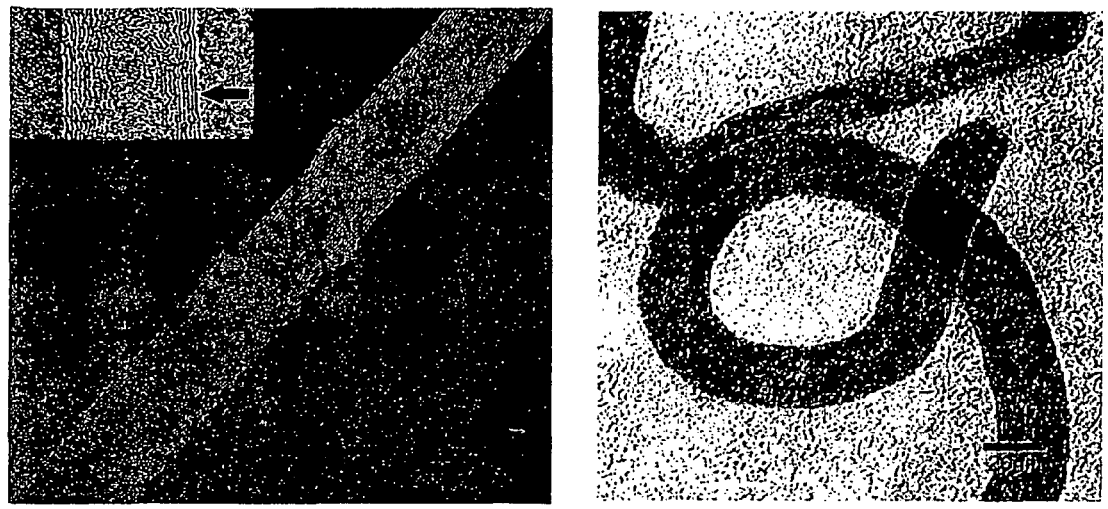
FIG. 1 shows a transmission electron microscope (TEM) picture of the carbon nanotube prepared by the method of the present invention.

In accordance with one aspect of the present invention, there is provided a method for the preparation of carbon nanotube from a liquid phased-carbon source which uses a liquid phased-hydrocarbon based material as carbon source and comprises the steps of heating and pressurizing the carbon source to the range of critical temperature and critical pressure, and reacting and cooling the carbon source in the presence of a metal seed catalyst to induce the growth of carbon nanotube.

Hereinafter, the present invention is described in detail.

The method for the preparation of carbon nanotube according to the present invention is capable of easily manipulating a raw material due to the use of a liquid phased-carbon source, which is different from the conventional methods for the preparation of carbon nanotube from a gas phased-carbon source, and preparing the carbon nanotubes under a mild condition maintaining a relatively low temperature and pressure that correspond to the critical temperature and pressure range of carbon source employed, which makes possible the mass-production of carbon nanotubes in a cost effective manner.

Since the method of the present invention employs a liquid phased-hydrocarbon based material as carbon source to grow a carbon backbone of the carbon nanotube and makes the carbon nanotube grow under the condition of forming a critical fluid, which equilibrates between liquid and gas phases, by heating and pressurizing the carbon source to the range of critical temperature and critical pressure in an high-pressure reactor, it is capable of producing the carbon nanotube in large quantities at a relatively lower temperature than that of the known methods using gas phased-carbon source. Namely, the technical feature of the inventive method is to develop the method using a liquid phased-carbon source, which heats and pressurizes the liquid phased-carbon source near to its critical region to induce pyrolysis (thermal decomposition), thereby making the carbon source grow in a form of carbon nanotube during the process of maintaining a balance between liquid and gas phases. The carbon source to be used in the present invention includes any liquid phased-hydrocarbon based material to which the liquid phased-method of the present invention can be applied. Preferably, the carbon source may be at least one of hydrocarbon based materials selected from the group of a saturated hydrocarbon, an unsaturated hydrocarbon, an aromatic hydrocarbon and a derivative thereof.

The method of the present invention may use a transition metal such as cobalt (Co), nickel (Ni) and iron (Fe), and a noble metal such as platinum (Pt) and is palladium (Pd) as a metal seed catalyst. The metal may be used alone or in a mixture of two or more metals. Further, the metal seed catalyst may be prepared in a form of metal nanoparticle or a metal complex, or a metal compound capable of spontaneously generating a seed during a reaction may be employed. Namely, a metal nanoparticle or a metal complex having a particle size of 50 nm or below, which is separately prepared at the outside of a reactor, may be added to a reaction system as the metal seed catalyst, or the seed catalyst may be spontaneously generated due to temperature and pressure of the reactor by reacting a metal compound capable of spontaneously generating a metal seed catalyst with a liquid phased-hydrocarbon based material in the reactor. The term "autogenous (spontaneous) seed catalyst" in the present invention means a seed catalyst which is spontaneously generated by controlling heating rate and pressurizing the liquid-phased hydrocarbon based material. The metal compound capable of spontaneously generating a seed includes a salt containing a metal, preferably an acid salt such as acetic acid, hydrochloric acid, sulfuric acid and nitric acid. The metal complex includes a single or mixed metal complex using ammonium or thiol as a ligand. Further, when a metal salt or a metal complex may be used as a metal seed catalyst, it is preferable to use it together with a reducing agent such as an alkali metal, alkali earth metal or a complex metal thereof, or any compound having a reducing power.

In the preparation of carbon nanotube according to the method of the present invention, it is preferable to use the liquid phased-hydrocarbon based material in the amount of ranging from 80 to 99.999 wt % and the metal seed catalyst ranging from 0.001 to 20 wt %. When the content of the metal seed catalyst is less than 0.001 wt %, it is very difficult to act as a seed catalyst, which makes the preparation of carbon nanotube more difficult. On the other hand, when the content of the metal seed catalyst is more than 20 wt %, the length of carbon nanotube becomes greatly shortened.

Since the critical temperature and critical pressure may differ depending on the kind of liquid phased-hydrocarbon material used as carbon source, the range of temperature and pressure may also vary depending on the kind of carbon source used selectively. The reaction temperature that the carbon source of the present invention reaches to a critical state by equilibrating between liquid and gas phases ranges from 200 to 800° C., and accordingly, an internal pressure of the reactor ranges from 1 to 400 atm. In addition, the reaction is carried out under a critical condition for a predetermined time. It is preferable to maintain the reaction for about 1 min to 30 hrs, and the reaction time may be regulated depending on physical property, conformation and yield of the desired carbon nanotube.

Further, since the physical property, conformation and yield of the desired carbon nanotube may be influenced by regulating a heating rate leading to a critical range and a cooling rate after a critical reaction in preparing carbon nanotube according to the present invention, it is very important to regulate these rates of heating and cooling. It is preferable to regulate the heating and cooling rate within the range from 0.01 to 50° C./min. More preferably, the heating rate ranges from 1 to 30° C./min, and the cooling rate, from 0.1 to 10° C./min.

As described above, while the known methods using a gas phased-carbon source used conventionally for preparing the carbon nanotube uses a high temperature condition ranging from 800 to 1000° C. or higher and requires a costly equipment for CVD (chemical vapor deposition), the inventive method of the present invention using a liquid phased-carbon source is capable of easily producing the carbon nanotube in large quantities under a mild temperature condition ranging from about 200 to 800° C.

Figure 2:
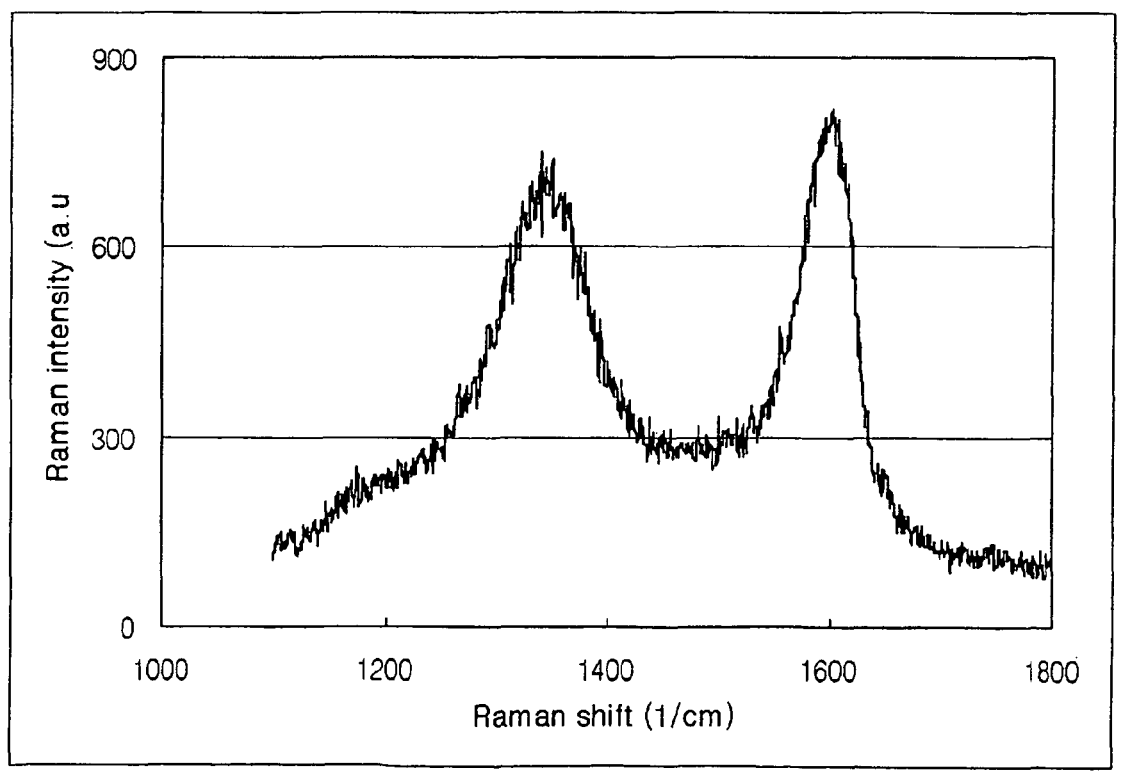
FIG. 2 shows a Raman spectrum of the carbon nanotube prepared by the method of the present invention.

Further, the carbon nanotube prepared by the inventive liquid phased-method have a diameter ranging from 15 to 20 nm which is shown in a TEM (transmission electron microscope) picture of FIG. 1, and have a sp2 binding of carbon near to 1595 cm$^{-1}$, which is confirmed in a Raman spectrum of FIG. 2. From theses results, it can be found that the carbon nanotube prepared by the method of the present invention have a well-developed graphitic structure.

This invention is explained in more detail based on the following Examples and Test Examples but they should not be construed as limiting the scope of this invention.

EXAMPLE

A. Preparation of a Carbon Nanotube By a Liquid Phased-Method Using an Autogenous Seed Catalyst Example 1

In order to perform an in situ spontaneous generation of a seed catalyst and subsequent preparation of carbon nanotubes in a real time, 2.49 g of cobalt(II) acetate tetrahydrate (Co(Ac)$_2$.4H$_2$O), 0.6 g of sodium metal as a reducing agent, 5.88 g of oleic acid as a reaction assistant agent and 143.4 g of phenylether as a hydrocarbon based material were added in all at the same time to a reactor having about 10 cm in diameter and 1 l in capacity.

After a reaction temperature was maintained at 500° C. for 1 hr, the reaction was stopped and the rate of heating and cooling were set at 10° C./min. After the reaction was completed, the reaction mixture was collected from the reactor and sufficiently washed with distilled water in a separating funnel to remove a by-product. Then, the prepared carbon nanotubes were dried.

FIG. 1 shows a transmission electron microscope (TEM) picture of the prepared carbon nanotubes, and FIG. 2, a Raman spectrum thereof.

Example 2

The carbon nanotubes were prepared the same as described in Example 1 except that 143.4 g of phenylether and 8.0 g of isopropylalcohol were employed as a hydrocarbon based material.

Example 3

The carbon nanotubes were prepared the same as described in Example 1 except that 1.5 g of $Co(Ac)_2 \cdot 4H_2O$, 0.5 g of $Fe(Cl)_2 \cdot 4H_2O$ and 0.45 g of $Ni(NO_3)_2 \cdot 4H_2O$ were added to a reactor in order to generate a complex seed catalyst for the preparation of autogenous seed catalyst.

B. Preparation of Carbon Nanotubes By a Liquid Phased-Method Using a Metal Nanoparticle Example 4

The carbon nanotubes were prepared the same as described in Example 1 except that instead of preparing the spontaneously generated seed catalyst using a metal compound, 0.5 g of the previously prepared Fe nanoparticle having a particle size of about 20 nm was added to a reaction solution.

Example 5

The carbon nanotubes were prepared the same as described in Example 4 except that after an oxide was prepared by incorporating Co and Ni into $Fe_3O_4$ ferrite nanoparticle as a seed catalyst and reduced at 400° C. for 30 min to obtain Co—Ni—Fe nanoparticles, about 1 g of the metal nanoparticles were added to a reaction solution.

Example 6

The carbon nanotubes were prepared the same as described in Example 4 except that 1.0 g of ammonia complex of $Co_{0.5}$—$Ni_{0.5}$—$Fe_{2.0}$ based metal and 1.0 g of Na as a seed catalyst were added to a reaction solution.

Example 7

The carbon nanotubes were prepared the same as described in Example 4 except that 1.0 g of thiol complex of $Co_{0.5}$—$Ni_{0.5}$—$Fe_{2.0}$ based metal and 1.0 g of Na as a seed catalyst were added to a reaction solution.

As a result of Examples 1 to 7, it has been found that the carbon nanotubes having about 20 to 50 nm in diameter were prepared in all Examples.

While the embodiments of the subject invention have been described and illustrated, it is obvious that various changes and modifications can be made therein without departing from the spirit of the present invention which should be limited only by the scope of the appended claims.

What is claimed is:

1. A method for preparing carbon nanotube from a liquid phased-carbon source, wherein the method uses a liquid phased-hydrocarbon based material in the amount of from 80 to 99.999 wt % as carbon source; and comprises the steps of heating and pressurizing said carbon source to the range of critical temperature and critical pressure, and reacting and cooling said carbon source in the presence of a reducing agent selected from the group of an alkali metal, alkali earth metal or a complex metal thereof and an autogenous seed catalyst which is a metal-containing acid salt wherein the acid is selected from the group of acetic acid, hydrochloric acid, sulfuric acid and nitric acid to induce the growth of carbon nanotube, wherein the heating rate is regulated within the range of from 1 to 30° C./min and the cooling rate is regulated within the range of from 1 to 10° C./min.

2. The method of claim 1, wherein said hydrocarbon based material is at least one hydrocarbon selected from the group consisting of a saturated hydrocarbon, an unsaturated hydrocarbon, an aromatic hydrocarbon and a derivative thereof;

said reaction temperature maintaining the critical state of said carbon source is ranging from 200 to 800° C.;

said reaction pressure maintaining the critical state of carbon source is ranging from 1 to 400 atm;

said critical state equilibrating between liquid and gas phases is maintained for 1 min to 30 hrs;

said heating rate is regulated within the range of from 1 to 30° C./min; and said cooling rate is regulated within e range of from 1 to 30° C./min.

3. The method of claim 1, wherein said metal of said metal-containing acid salt is at least one selected from the group consisting of a transition metal.

4. The method of claim 1, wherein said critical state equilibrating between liquid and gas phases is maintained for 1 min to 30 hrs.

5. The method of claim 1, wherein said hydrocarbon based material is at least one hydrocarbon selected from the group consisting of a saturated hydrocarbon, an unsaturated hydrocarbon, an aromatic hydrocarbon and a derivative thereof.

6. The method of claim 1, wherein said reaction temperature maintaining the critical state of said carbon source is ranging from 200 to 800° C.

7. The method of claim 1. wherein said reaction pressure maintaining the critical state of carbon source is ranging from 1 to 400 atm.

* * * * *